United States Patent [19]
Conley

[11] Patent Number: 5,470,517
[45] Date of Patent: Nov. 28, 1995

[54] METHOD OF PULTRUSION

[76] Inventor: Ed Conley, 7119 E. Shea, #109-224, Scottsdale, Ariz. 85254

[21] Appl. No.: 353,447

[22] Filed: Dec. 9, 1994

[51] Int. Cl.⁶ .............................. B29B 15/14; B29C 43/36
[52] U.S. Cl. .......................... 264/137; 156/180; 264/257; 264/285; 264/295; 264/313; 264/317; 425/112
[58] Field of Search ...................................... 264/136–137, 264/313, 174, 317, 257, 166, 285, 295; 425/112; 156/180

[56] References Cited

U.S. PATENT DOCUMENTS

| | | |
|---|---|---|
| 3,859,409 | 1/1975 | Coonrod . |
| 4,209,482 | 6/1980 | Schwarz . |
| 4,347,287 | 8/1982 | Lewis et al. ............................ 264/136 |
| 4,445,957 | 5/1984 | Harvey .................................. 156/180 |
| 4,623,290 | 11/1986 | Kikuzawa et al. ...................... 411/350 |
| 4,812,343 | 3/1989 | Kiekhaefer et al. ..................... 264/136 |
| 4,828,897 | 5/1989 | Staneluis et al. .......................... 428/71 |
| 4,879,073 | 11/1989 | Kromrey ................................. 264/313 |
| 4,892,600 | 1/1990 | Beever .................................... 156/180 |
| 4,894,190 | 1/1990 | Kromrey ................................. 264/347 |
| 4,978,360 | 12/1990 | Devanathan ........................... 264/136 |
| 5,055,242 | 10/1991 | Vane ....................................... 264/313 |
| 5,084,222 | 1/1992 | Glemet et al. . |
| 5,139,862 | 8/1992 | Swift et al. ............................. 264/172 |
| 5,294,394 | 3/1994 | Sakai et al. . |

Primary Examiner—Jeffery R. Thurlow
Attorney, Agent, or Firm—Christopher A. Klein

[57] ABSTRACT

A method of pultrusion is provided that includes the steps of saturating a bundle of fibers in a curable resin, pulling the saturated fibers (also known as "prepreg") into a flexible mold, manipulating the mold (with the saturated fibers therein) into a given shape or form, allowing the saturated fibers to cure or harden, and then removing the flexible mold by mechanical or chemical means. This novel method permits one to mold prepreg into any given shape prior to hardening, not limited by the shape of a given mold or die.

16 Claims, 1 Drawing Sheet

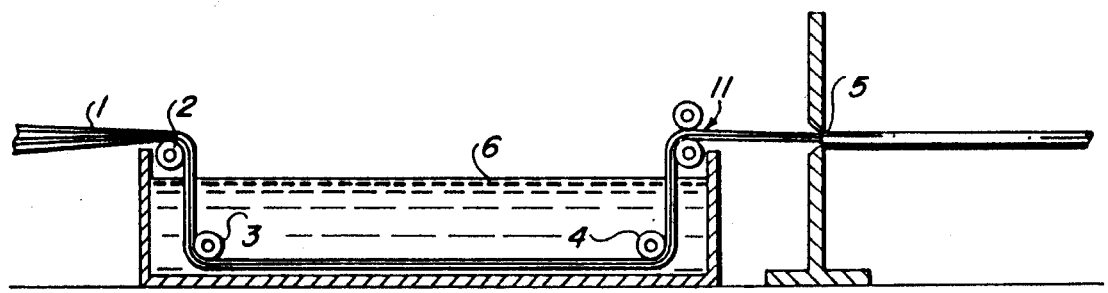
FIG. 1
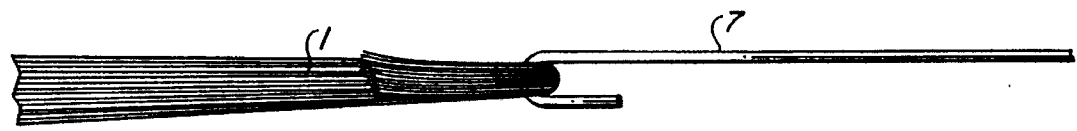
FIG. 2
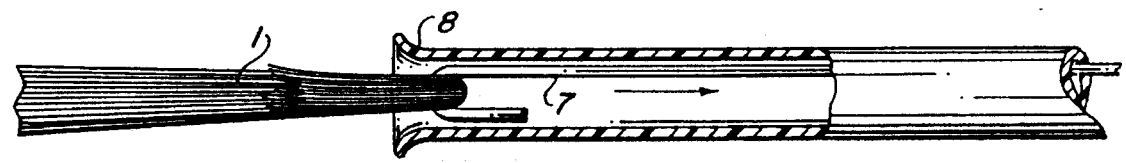
FIG. 3
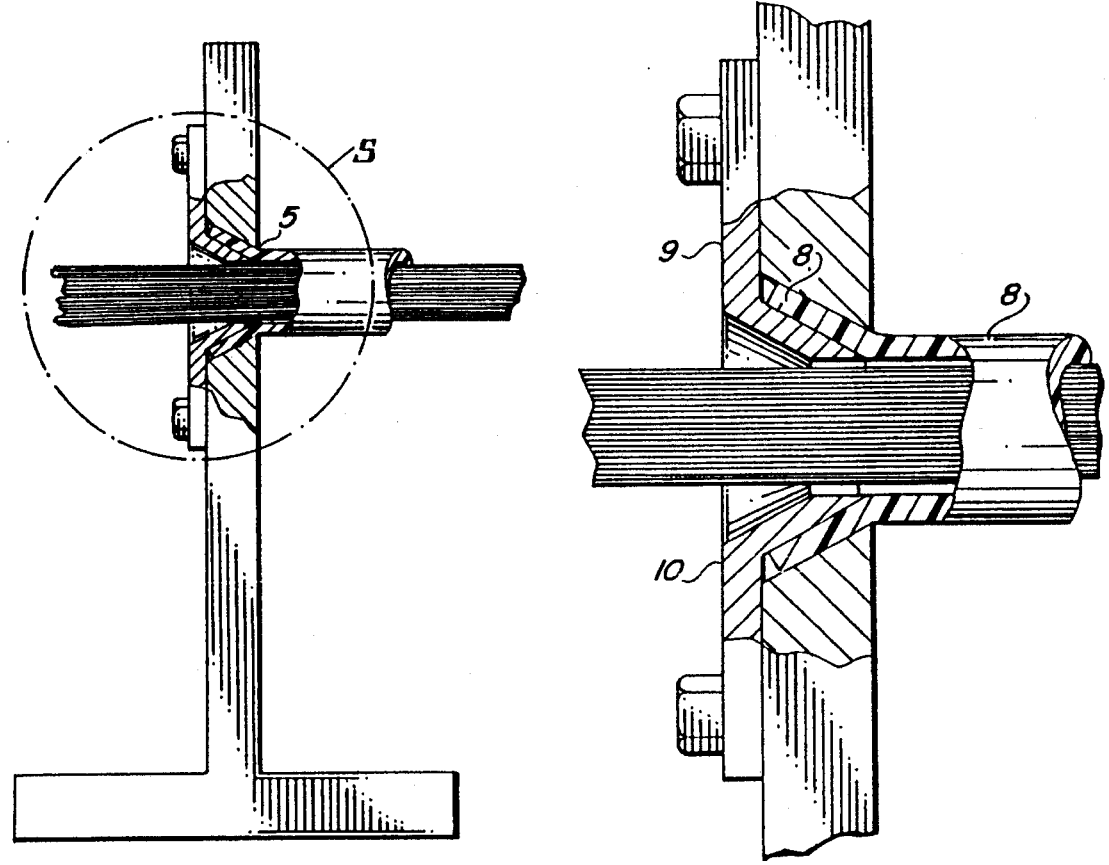
FIG. 4
FIG. 5

METHOD OF PULTRUSION

FIELD OF THE INVENTION

The present invention relates to a process for manufacturing thermosetting polymer shaped articles reinforced with long continuous fibers by pultrusion. More particularly, the invention relates to a method of pultrusion into a flexible mold.

BACKGROUND OF THE INVENTION

In a general manner, the process of manufacturing thermosetting resin articles by pultrusion is known. The usual process consists of impregnating a plurality of fibers with resin, and then passing the bulk substance into a heated chamber. At the chamber exit, the fibers coated with resin enter a heated device which gives the final shape to the product being produced, which is cured as it emerges from the device. This is done in a continuous process.

Generally, a "prepreg" is used in a pressure molding process. A prepreg is a resin-coated cloth or fiber. The resin is usually applied from a solvent solution, then dried or partially cured. In the partially cured stage it is easy to handle and will soften and mold upon heating. In the automotive industry, for example, prepregs are generally known as sheet molding compounds which are large enough sheets to mold into doors, hoods, fenders and body parts in general. Prepregs are also valuable in aircraft and aerospace industries.

The usual method of pultrusion involves the pulling of a prepreg or resin coated fibers through a mold to form a shaped article in a continuous process. This method is used to form many types of articles known in the art, and often involves pulling a prepreg through a rigid metal forming device. This way a certain shape is attained (e.g., pulling a prepreg through a mold shaped like an 'T' to form an "I-beam" for construction). For a discussion regarding this technology see U.S. Pat. No. 3,567,814 to Glesner; U.S. Pat. No. 4,209,482 to Schwarz; and U.S. Pat. No. 5,084,222 to Glemet et al., all incorporated herein by reference. Additionally, for a detailed discussion of thermosets and thermosetting technology, see "Advanced Thermoset Composites: Industrial and Commercial Applications", edited by Margolis, James M., Van Nostrand Reinhold Company (New York) 1986, incorporated herein by reference.

All prior art methods, however, are limited in that all resin saturated fibers are pulled through a single rigid mold or die, and are cured to the specific shape of the mold or die in a continuous process. Prepreg is also made by pultrusion by shaping with a rigid die or mold and "staged" for later use. The term "staged" refers to the partially cured condition, which permits the prepreg to be manipulated to a desired shape. Staging can be accomplished by temperature control, or using a chemical catalyst, as known in the art. Once the prepreg is formed into a desired shape, it is then fully cured and retains its shape. Prepreg made by this method results in resin tackiness and must be separated with release sheets and frozen for shipment to users.

The present invention permits a much broader range of molding by providing a method of pultrusion into a flexible mold. Therefore, after the resin coated fibers are pulled into the flexible mold, they can be shaped or maneuvered into any desired form and staged with a latent catalyst for subsequent use, thus avoiding contamination of resin onto one's hands or clothes. The flexible mold is then removed by chemical or mechanical means.

Accordingly, it is an object of the present invention to provide a method of pultrusion comprised of pulling resin coated fibers into a flexible mold.

A further object of the present invention is to provide a method of pultrusion capable of providing a curable resin composition in a flexible and maneuverable mold, said mold capable of being manipulated manually without the need for hand or equipment protection.

An additional object of the present invention is to provide a method of pultrusion comprised of pulling resin impregnated fibers into a flexible mold, shaping said mold into a desired shape, and removing said flexible mold by mechanical or chemical means.

SUMMARY OF THE INVENTION

In accordance with these and other objects of the present invention. a method of pultrusion is provided comprised of saturating a plurality of fibers or fabrics, or a combination thereof, with a curable resin compound, to form a prepreg. Said prepreg is then pulled into a flexible mold or tubing, and then the mold (containing the prepreg) is maneuvered into a desired shape or form. That the prepreg is contained in the flexible mold permits manual manipulation of the mold without contaminating equipment or personnel. The prepreg is then permitted to cure in its desired shape, and the flexible mold is removed by mechanical or chemical means.

BRIEF DESCRIPTION OF THE FIGURES

FIG. 1 shows a view of a process by which fibers are pulled through a liquid resin.

FIG. 2 shows a pull hook connected to a fiber bundle for pultrusion.

FIG. 3 shows a pull hook connected to a fiber bundle being pultruded into a mold.

FIG. 4 shows a view of a flexible tubing or mold attached to an anchor with the fibers being drawn therein.

FIG. 5 shows a close-up view of a flexible mold support.

DETAILED DESCRIPTION OF THE INVENTION

The method of the present invention involves pultrusion of prepreg into a flexible mold. Prepreg describes a composition of resin saturated fibers, fabrics, braided sleeving, or a combination thereof. For simplicity in this description of the invention, fibers will be referred to although this is not meant to limit the scope of the invention and fabrics and/or braids can be substituted therefore. For a preferred embodiment of the invention, reinforcing fibers are used comprised of, for example but not limited to, metal, glass, polyethylene, natural fibers (e.g., cotton), thermoplastics, carbon graphite, boron, alumina, silicon carbide, and/or aramid (e.g., DuPont'a KEVLAR). Continuous fibers can be used wound together, bundled, or braided, or pieces of fibers can be used wound together, bundled, or braided.

The fibers used are coated with a matrix or saturating material that may reach an intermediate stage at which the material may be shaped, and then at a later stage be cured to a solid. The matrix or saturating material can be a thermoset such as polyester, epoxy novalac, bisphenol A epoxy, vinylester, polyimide, phenolics, and may include ceramics or combinations of the aforementioned saturating materials and ceramics or ceramic fibers. The materials used to saturate the fibers are commonly referred to as resins.

As shown in FIG. 1, the fibers i may be saturated by running them through a tub of liquid resin. The fibers are bundled at point 2, then passed into liquid resin 6, and kept submerged in liquid resin 6 by arm 3 and arm 4. The saturated fibers are then removed from the tub, and any excess resin is squeezed out at squeeze-out bushing 5. The fibers are then in a resin saturated condition and ready to be pulled into a flexible tubing and then conditioned for delayed use by staging (i.e., brought to an intermediate stage between saturation with resin and full cure or part cure) which can then be finally shaped and cured. Those in the art refer to this intermediate stage as the "B-stage", wherein the "A-stage" refers to the freshly saturated fibers, and the "C-stage" is full cure. In the "B-stage" the fibers are still capable of being manipulated.

As shown in FIG. 2, in order to pull fibers 1 through any given mold, a pull hook 7 is used. To attach fiber bundle 1 to pull hook 7, fiber bundle 1 (before saturation with liquid resin 6) is looped through pull hook 7, doubled back and wetted with a fast setting cyanoacrylate, which requires only a few minutes setting time. Fiber bundle 1 is then ready to be pulled through liquid resin 6 and into a given flexible mold or tubing.

As shown in FIG. 3, pull hook 7 with fiber bundle 1 connected thereto is pulled by pultrusion into mold 8. Flexible mold 8 may be any shape, but is preferably a tube of any given length. Flexible mold 8 may be comprised of any flexible material such as, but not limited to, rubber, plastic, organic membranes, or flexible metal tubing (e.g., copper). In one embodiment of the present invention, a silicon rubber flexible mold is used. As they are pulled into mold 8, fibers 1 saturated with liquid resin 6 takes the shape of mold 8, which in this case is a tube. Mold 8 can then be manipulated into any desired shape or form. Once mold 8 is manipulated into a desired shape, it is held or clamped until the resin cures to hardness.

As shown in FIG. 4 and FIG. 5, flexible mold 8 may be held securely in place by anchor supports 9 and 10. These anchor supports may be curved clamps capable of placing pressure on mold 8 and keeping it in place. Any available method of securing mold 8 may be used to keep the mold in place as fiber bundle 1 is pultruded therein.

After the resin saturated fibers cure to hardness, mold 8 is then removed by chemical or mechanical means. Mechanically, mold 8 may be cut and stripped away or chiseled or flaked away. Chemically, solvents such as N-N-dimethyl-formamide or trichloroethylene may be used to remove mold 8. After mold 8 is removed, one is left with a fiber reinforced resin composite in the shape formed with mold 8.

This method of pultrusion into a flexible mold is not known in the art. It is a superior way, however, in which to manipulate prepreg, and eliminates tackiness and mold release problems when formed into configurations such as automotive roll bars, bicycle frames, coils, special shape bends for reinforcing bars, or any other curved shape. The usefulness of this novel method is evident to those in the trade, and allows unlimited manual usage which is a departure from regular prepreg tapes or sheets and eliminates the problem of resin clean-up. Resin clean-up has been a major problem of the composite industry for years. This new novel method permits freedom of manipulation in fabrication, and avoids contamination of personnel, without the use of gloves. Additionally, it is to be understood that the resulting items utilizing this process may be round, square, or any shape which is available in a flexible mold or tubing of rubber, plastic, organic membranes or any flexible material.

The invention has been described in detail with particular reference to a preferred embodiment thereof, but it will be understood that the invention is capable of other and different embodiments. As is readily apparent to those skilled in the art, variations and modifications can be affected within the spirit and scope of the invention. Accordingly, the foregoing disclosure, description, and figures are for illustrative purposes only, and do not in any way limit the invention, which is defined only by the claims.

I claim:

1. A method of molding reinforced synthetic resinous bodies comprising the steps of
    (a) supplying a plurality of fibers;
    (b) saturating said fibers with a resin;
    (c) supplying a flexible mold to receive said saturated fibers;
    (d) introducing said saturated fibers into said flexible mold;
    (e) manipulating said flexible mold into a desired shape or form;
    (f) allowing said resin to cure; and
    (g) removing said flexible mold.

2. The method of claim 1 wherein said flexible mold is comprised of a flexible hollow tube.

3. The method of claim 1 wherein said fibers are comprised of a material selected from the group consisting of metal, glass, polyethylene, natural fibers, carbon graphite, boron, aluminum oxide, silicon carbide, and aramid (e.g., KEVLAR).

4. The method of claim 1 wherein said resin is comprised of a thermoset selected from the group consisting of unsaturated polyester, epoxy novalac, bisphenol A epoxy, vinylester, polyimide and phenolics.

5. The method of claim 1 wherein said flexible mold is comprised of a material selected from the group consisting of rubber, plastic, and metal.

6. The method of claim 1 wherein said introducing step is comprised of pulling said saturated fibers into said flexible mold.

7. The method of claim 1 wherein said removing step is performed mechanically.

8. The method of claim 1 wherein said removing step is performed with the use of chemicals.

9. The method of claim 1 wherein said flexible mold is comprised of rubber.

10. The method of claim 1 wherein said flexible mold is comprised of plastic.

11. A method of molding reinforced synthetic resinous bodies comprising the steps of
    (a) providing a plurality of fibers;
    (b) providing a hollow, elongated, flexible mold;
    (c) attaching said fibers to a hook capable of pulling said fibers into said flexible mold;
    (d) providing a heat hardenable resin;
    (e) saturating said fibers with said resin to thereby form resin saturated fibers;
    (f) pulling said resin saturated fibers into said flexible mold;
    (g) manipulating said flexible mold into a desired shape;
    (h) curing said resin to hardness; and
    (i) removing said flexible mold from said cured resin saturated fibers.

12. The method of claim 11 wherein said fibers are comprised of a material selected from the group consisting of metal, glass, polyethylene, natural fiber, carbon graphite, boron, alumina, silicon carbide, and aramid (e.g., KEVLAR).

13. The method of claim 11 wherein said resin is comprised of a thermoset selected from the group consisting of unsaturated polyester, epoxy novalac, bisphenol A epoxy, vinylester, polyimide and phenolics.

14. The new method of claim 2 wherein said desired shape is a coil.

15. The method of claim 11 wherein said flexible mold is comprised of a flexible hollow tube.

16. The method of claim 15 wherein said desired shape is a coil.

* * * * *